(12) United States Patent
Chang et al.

(10) Patent No.: US 11,625,225 B2
(45) Date of Patent: *Apr. 11, 2023

(54) APPLICATIONS OF AND TECHNIQUES FOR QUICKLY COMPUTING A MODULO OPERATION BY A MERSENNE OR A FERMAT NUMBER

(71) Applicant: NVIDIA CORPORATION, Santa Clara, CA (US)

(72) Inventors: Xiaofei Chang, San Mateo, CA (US); Manuel Gautho, Los Gatos, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/880,435

(22) Filed: Aug. 3, 2022

(65) Prior Publication Data
US 2022/0374207 A1    Nov. 24, 2022

Related U.S. Application Data

(63) Continuation of application No. 16/941,409, filed on Jul. 28, 2020, now Pat. No. 11,455,145.

(51) Int. Cl.
*G06F 7/72*    (2006.01)
*G06F 7/535*    (2006.01)
*G06F 7/50*    (2006.01)

(52) U.S. Cl.
CPC .............. *G06F 7/727* (2013.01); *G06F 7/50* (2013.01); *G06F 7/535* (2013.01); *G06F 7/729* (2013.01)

(58) Field of Classification Search
CPC . G06F 7/72; G06F 7/724; G06F 7/729; G06F 12/0802; G06F 12/0806;
(Continued)

(56) References Cited

U.S. PATENT DOCUMENTS 10,031,846 B1 *   7/2018   Finn .................... G06F 7/78
2004/0225859 A1 *   11/2004   Lane ................ G06F 12/0864
711/202

(Continued)

OTHER PUBLICATIONS

Patterson et al., "Arithmetic for Computers", Numerical Precision is the very soul of Science, Chapter 3, Elsevier Science & Technology, 2007, 80 pages.

*Primary Examiner* — Emily E Larocque
(74) *Attorney, Agent, or Firm* — Artegis Law Group, LLP

(57) ABSTRACT

Various embodiments include a modulo operation generator associated with a cache memory in a computer-based system. The modulo operation generator generates a first sum by performing an addition and/or a subtraction function on an input address. A first portion of the first sum is applied to a lookup table that generates a correction value. The correction value is then added to a second portion of the first sum to generate a second sum. The second sum is adjusted, as needed, to be less than the divisor. The adjusted second sum forms a residue value that identifies a cache memory slice in which the input data value corresponding to the input address is stored. By generating the residue value in this manner, the cache memory efficiently distributes input data values among the slices in a cache memory even when the number of slices is not a power of two.

19 Claims, 8 Drawing Sheets

(58) Field of Classification Search
CPC ............ G06F 12/0811; G06F 12/0842; G06F 12/0844; G06F 12/0846; G06F 12/0864; G06F 15/8069
See application file for complete search history.

(56) References Cited

U.S. PATENT DOCUMENTS

2007/0294330 A1\* 12/2007 Lipetz ..................... G06F 7/727
 708/491
2016/0350078 A1\* 12/2016 Fenney ..................... G06F 5/01

\* cited by examiner

APPLICATIONS OF AND TECHNIQUES FOR QUICKLY COMPUTING A MODULO OPERATION BY A MERSENNE OR A FERMAT NUMBER

CROSS-REFERENCE TO RELATED APPLICATIONS

This application is a continuation of the co-pending U.S. patent application titled, "APPLICATIONS OF AND TECHNIQUES FOR QUICKLY COMPUTING A MODULO OPERATION BY A MERSENNE OR A FERMAT NUMBER," filed on Jul. 28, 2020 and having Ser. No. 16/941,409. The subject matter of this related application is hereby incorporated herein by reference.

FIELD OF THE VARIOUS EMBODIMENTS

Various embodiments relate generally to computer processing architectures, more specifically, to applications of and techniques for quickly computing a modulo operation by a Mersenne or a Fermat number.

DESCRIPTION OF THE RELATED ART

Modulo operations, also referred to herein as "modulo operations," have various applications in computer-based systems. A modulo operation, also referred to herein as a "modulo operation," generates a value representing the remainder, referred to herein as the "residue value," after dividing a first operand, referred to herein as the "dividend," by a second operand, referred to herein as a "divisor." In that regard, 7 modulo 6 generates a value of 1, 7 modulo 7 generates a value of 0, and 7 modulo 8 generates a value of 7, and so on. In one example application, modulo operations could be employed to direct received data items to certain portions of a cache memory in a computer system. Typically, a cache memory is divided into a set of cache memory slices. A modulo operation is applied to two operands to determine the cache memory slice to store, fetch, or read a particular received data item. The dividend of the modulo operation is the address of a received data item to be stored in the cache memory. The divisor of the modulo operation is the number of slices in the cache memory. The value generated by the modulo operation identifies the number of the cache memory slice where the received data item is stored, fetched from, or read from. This technique distributes received data items among the cache memory slices more or less evenly.

The total number of cache memory slices is typically a power of two, such as 8 slices or 16 slices. In such cases, the value of the modulo operation is simply the value represented by the last 'x' bits of the address of the received data item, where 'x' is the power of two corresponding to the number of cache memory slices. If the cache memory is divided into $2^3=8$ cache memory slices, then the value generated by the modulo operation is the value represented by the last 3 bits of the address of the received data item. Similarly, if the cache memory is divided into $2^4=16$ cache memory slices, then the value generated by the modulo operation is the value represented by the last 4 bits of the address of the received data item.

In certain situations, the number of cache memory slices is not a power of two. In one example, one of the cache memory slices in a cache memory manufactured with 16 cache memory slices could fail during the manufacturing process, e.g., due to a manufacturing defect, or later when the cache memory is installed in a computer system. The cache memory could still be operable by employing a modulo 15 operation to distribute data items among the remaining 15 cache memory slices, albeit with somewhat reduced performance. In another example, a cache memory could be manufactured with 17 cache memory slices so that, if a cache memory slice fails, the cache memory would still have 16 cache memory slices. However, if all 17 cache memory slices are operable, a modulo 17 operation could be employed to distribute data items among the 17 cache memory slices.

One potential drawback with the above approach for distributing data items in cache memory is that modulo operations are significantly more complex when the divisor is not a power of two. Such modulo operations oftentimes involve executing multiple loops where the multiple loops may be executed sequentially or concurrently. One loop sums the digits, also referred to herein as the "coefficients," of the dividend. The second loop repeatedly subtracts the divisor from the sum until the result is less than the divisor. This process of repeated subtraction may take significantly longer than performing a modulo operation when the divisor is a power of two. Further, as the values of the coefficients of the dividend increase, the amount of time needed to perform the modulo operation also increases. This increase in the time needed to perform the modulo operation correspondingly increases the amount of time between receiving a data item and storing the data item in the cache memory. As a result, the performance of the cache memory may significantly decrease when the number of functional slices in the cache memory is not a power of two.

As the foregoing illustrates, what is needed in the art are more effective techniques for performing modulo operations in computer-based systems.

SUMMARY

Various embodiments of the present disclosure set forth a computer-implemented method for performing a modulo operation in a computer-based system. The method includes performing a first set of summations on an input value associated with the modulo operation to generate a first sum. The method further includes accessing a correction value associated with a first portion of the first sum. The method further includes performing a second set of summations on the correction value and a second portion of the first sum to generate a second sum. The method further includes generating a result of the modulo operation based on the second sum.

Other embodiments include, without limitation, a system that implements one or more aspects of the disclosed techniques, and one or more computer readable media including instructions for performing one or more aspects of the disclosed techniques.

At least one technical advantage of the disclosed techniques relative to the prior art is that, with the disclosed techniques, modulo operations involving a divisor that is not a power of two are performed in less time relative to modulo operations involving a divisor that is a power of two. Further, modulo operations involving a divisor that is not a power of two are performed in the same amount of time regardless of the value of the dividend. As a result, operations that include a modulo operation, such as distributing data items among slices in a cache memory, are performed more efficiently relative to prior art techniques. More specifically, the performance of a cache memory that includes 15 slices or 17 slices may have the same, or nearly the same, performance as a cache memory that includes 16 slices.

These advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
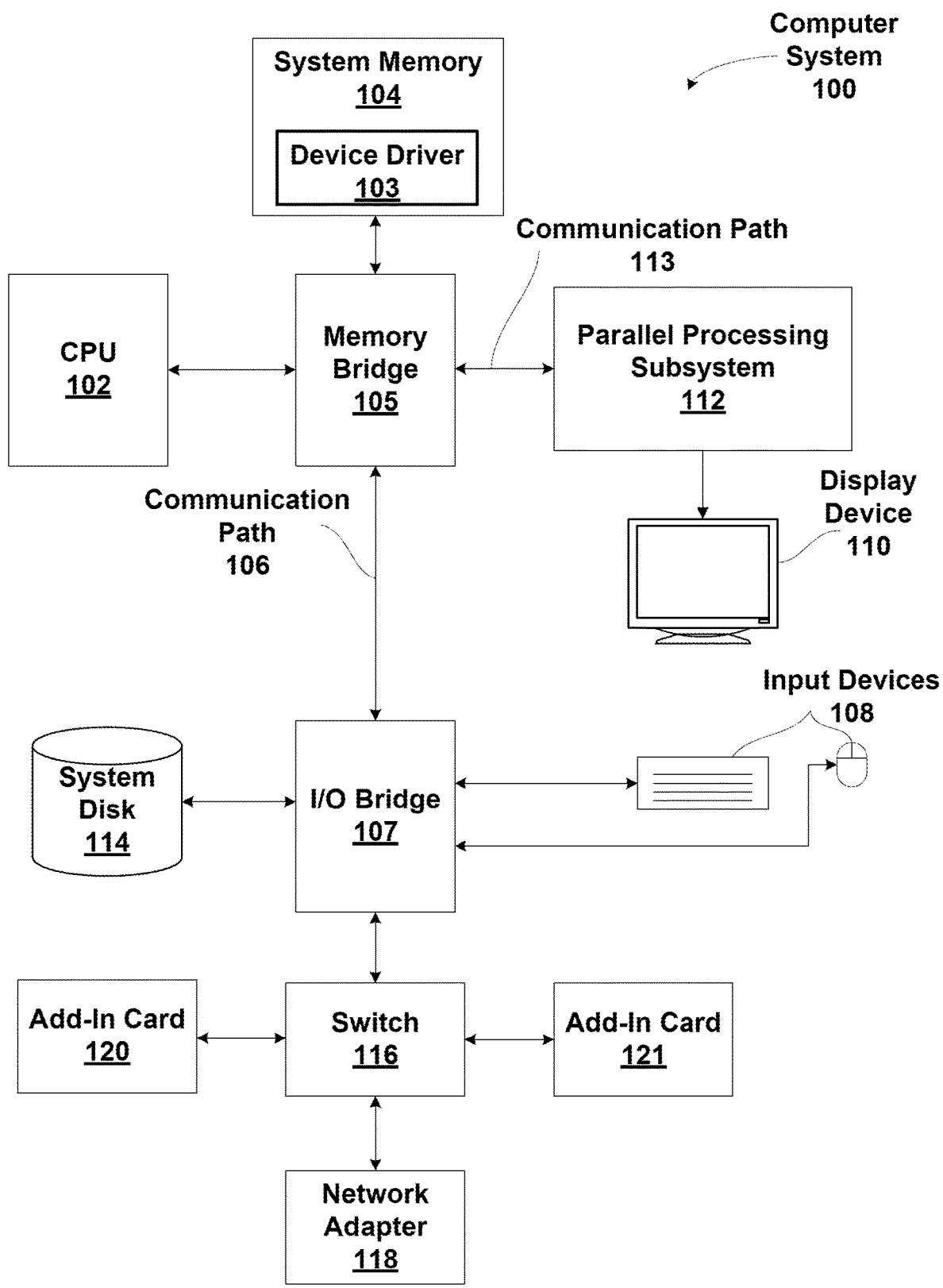
FIG. 1 is a block diagram of a computer system configured to implement one or more aspects of the various embodiments.

FIG. 1 is a block diagram of a computer system 100 configured to implement one or more aspects of the various embodiments. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
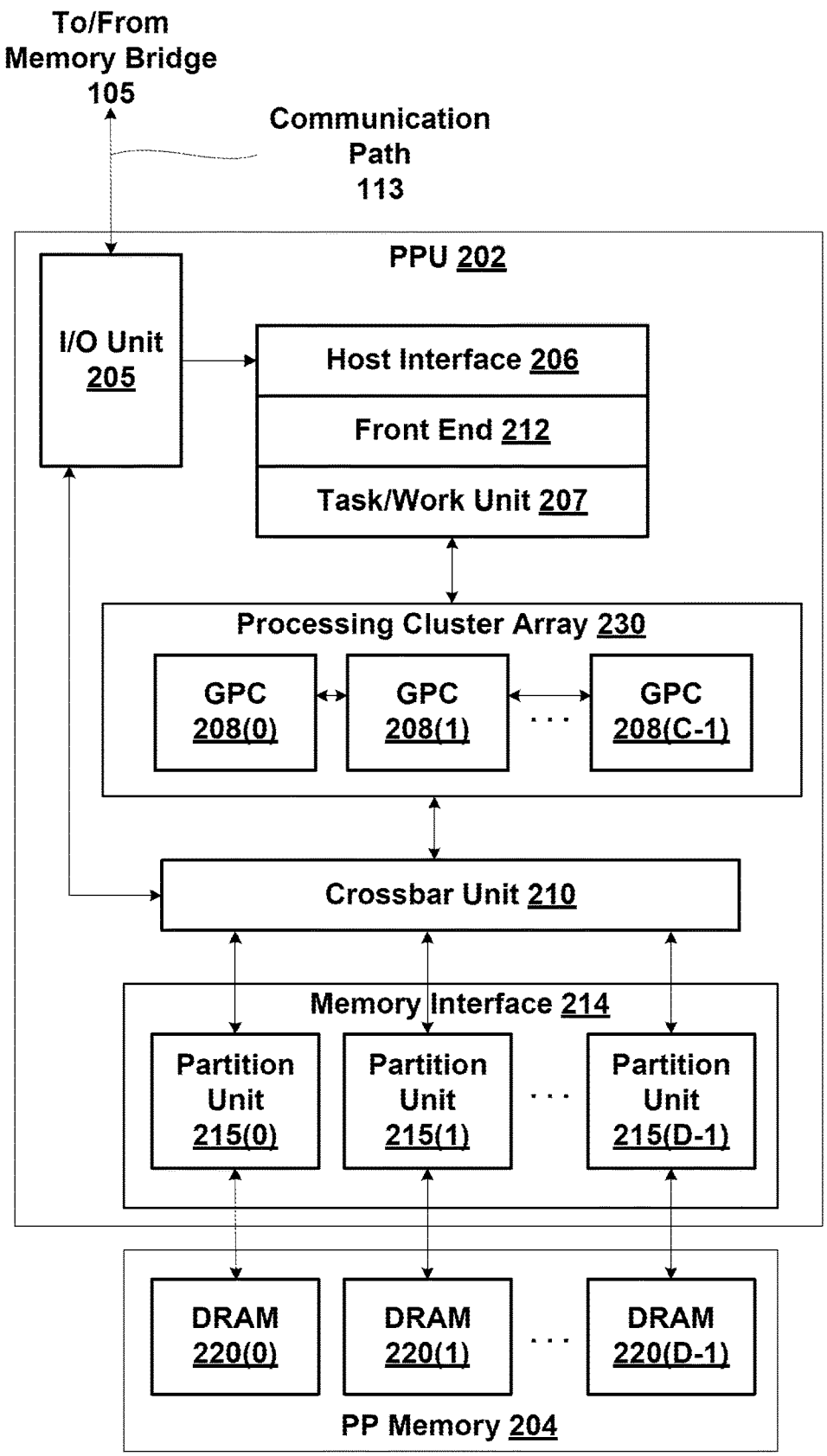
FIG. 2 is a block diagram of a parallel processing unit (PPU) included in the parallel processing subsystem of FIG. 1, according to various embodiments.

FIG. 2 is a block diagram of a parallel processing unit (PPU) 202 included in the parallel processing subsystem 112 of FIG. 1, according to various embodiments. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPC 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
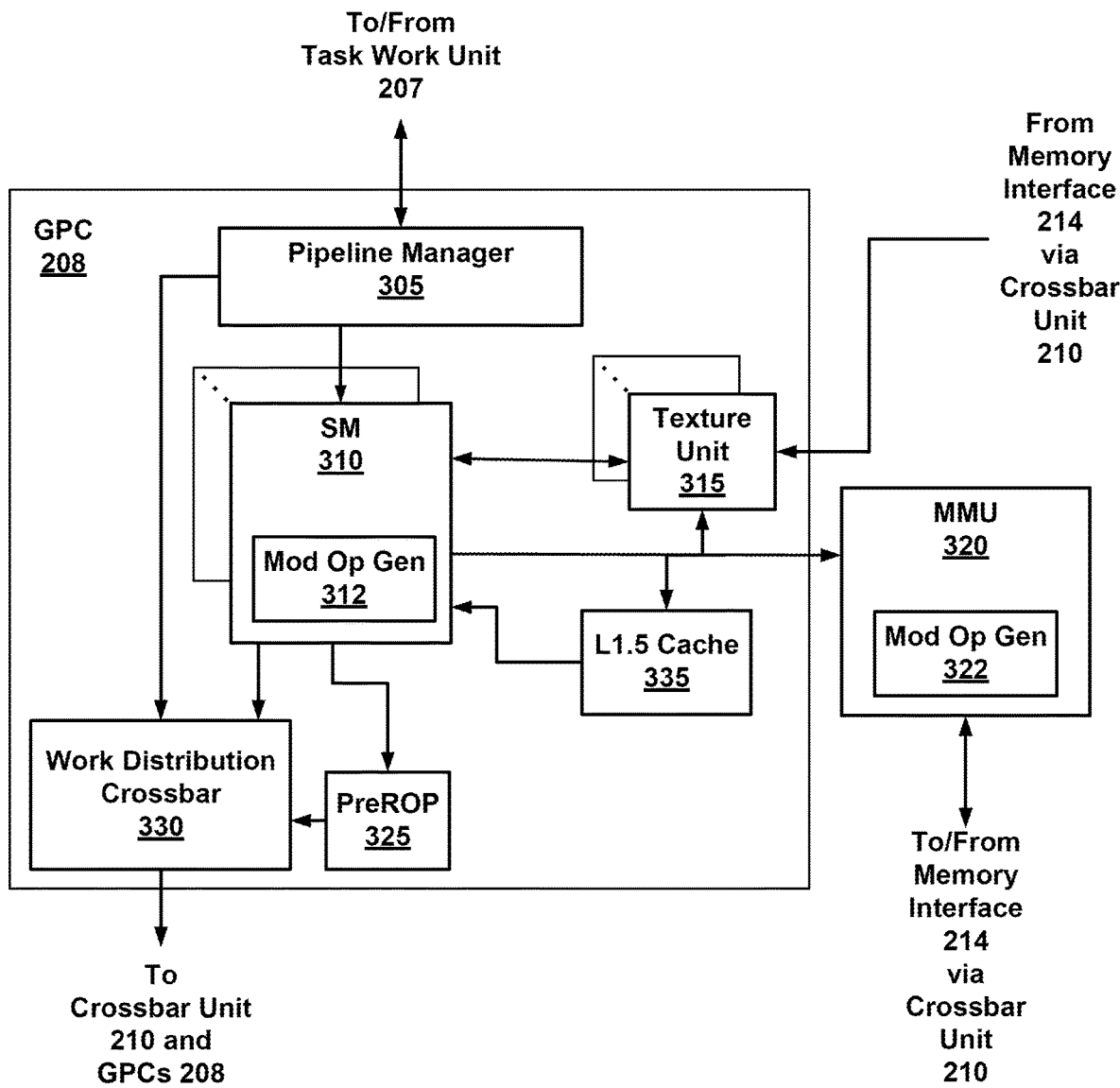
FIG. 3 is a block diagram of a general processing cluster included in the parallel processing unit of FIG. 2, according to various embodiments.

FIG. 3 is a block diagram of a general processing cluster 208 included in the parallel processing unit 202 of FIG. 2, according to various embodiments. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing, among other things, texture loads and texture operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3 in no way limits the scope of the present disclosure.

In some embodiments, one or more of the SMs 310 may include a modulo operation generator (mod op gen) 312. As further described herein, when an SM 310 executes a modulo instruction involving a divisor supported by the modulo operation generator 312, the SM 310 may route the modulo operation through the modulo operation generator 312 to generate the residue value with improved performance relative to prior techniques. Further, in some embodiments, the MMU 320, includes or is associated with a modulo operation generator (mod op gen) 322. The modulo operation generator 322 performs a modulo operation on the memory address of the input value, where the divisor of the modulo operation is the number of slices. The residue value of the modulo operation identifies the cache memory slice where the input value is to be stored.

Please note, as used herein, references to shared memory may include any one or more technically feasible memories, including, without limitation, a local memory shared by one or more SMs 310, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server or in a data center and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Furthermore, images generated applying one or more of the techniques disclosed herein may be used to train, test, or certify deep neural networks (DNNs) used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Fast Residue Computation for Modulo Operations

As described herein, traditional approaches for computing results of modulo operations involve executing multiple loops, where the multiple loops may be executed sequentially or concurrently. One loop sums the digits, also referred to herein as the "coefficients," of the dividend. The second loop repeatedly subtracts the divisor from the sum until the result is less than the divisor. This process of repeated subtraction may take significantly longer than performing a modulo operation when the divisor is a power of two.

Various embodiments include a modulo operation generator in a computer-based system that performs modulo operations in less time, relative to these traditional approaches. The modulo operation generator includes an accumulation circuit that performs a first set of summations on an input value to generate a first sum. The first set of summations may include an addition function and/or a subtraction function. The modulo operation generator further includes a lookup and correction circuit that includes a lookup table and an adder. A first portion of the first sum is applied to a lookup table that generates a correction value. The adder performs a second set of summations on the correction value and a second portion of the first sum to generate a second sum. The modulo operation generator further includes a test and correct circuit that adjusts the second sum if the second sum is greater than or equal to the divisor of the modulo operation generator. The test and correct circuit transmits the final residue value determined by the modulo operation generator.

One use case for the modulo operation generator is to determine which cache slice receives a particular input value. Typically, an MMU, such as MMU 320, includes or is associated with cache steering logic with a modulo operation generator, such as modulo operation generator 322. Such cache steering logic performs a modulo operation on the memory address of the input value, where the divisor of the modulo operation is the number of slices. The residue value of the modulo operation identifies the cache memory slice where the input value is to be stored. In the case of a cache memory where the number of cache memory slices is a power of two 'n,' the residue value of the modulo operation is simply the least significant n bits of the memory address. If the number of cache memory slices is not a power of two, then the residue value is performed by executing sequential or concurrent loops operations. This approach may be time consuming, thereby reducing performance of the cache memory. With the disclosed approach, the modulo operation generator does not execute loop operations. Instead, the modulo operation generator incurs only the logic delay through the stages of the modulo operation generator. If the logic delay through the modulo operation generator is less than the clock cycle of the MMU, then the residue value may be determined in one clock cycle. In one example, the modulo operation generator is able to compute the residue value in one clock cycle at a 2.14 GHz clock rate with sufficient margin.

Another use case for the modulo operation generator is within an arithmetic-logic unit (ALU) of a processor, such as a GPU or a CPU. In some embodiments, one or more SMs 310 may include a modulo operation generator 322. When executing a modulo operation, the ALU may be configured to automatically detect a modulo operation generator employing the disclosed techniques is available for the divisor of the modulo operation. If such a modulo operation generator exists, then the processor routes the modulo operation through the modulo operation generator to generate the residue value with improved performance relative to prior techniques. Additionally or alternatively, the instruction set of the processor may include one or more special instructions for accelerated modulo operations. When the processor executes such an instruction, the processor routes the modulo operation through the modulo operation generator to generate the residue value with improved performance relative to prior techniques.

In some embodiments, the modulo operation generator performs modulo operations where the divisor is a Mersenne number. Mersenne numbers are of the form $M=2^n-1$, where n is an integer. A subset of Mersenne numbers, referred to herein as "Mersenne primes" are of the form $M=2^n-1$, with the additional property that n is a prime number. For n=2, 3, 4, or 5, the corresponding Mersenne numbers are 3, 7, 15, and 31, respectively. Of these Mersenne numbers, 3, 7, and 31 are Mersenne primes, while 15 is not a Mersenne prime.

In one example, the modulo operation generator performs modulo 15 operations on incoming values represented in base 16, also referred to herein as "hexadecimal," format. In base 16 format, each digit represents a 4-bit number in the range of 0-15. For a given number 'N' that has a width of 'w' bits, a number 'W' of coefficients may be computed for a given Mersenne divisor. Based on the Mersenne divisor selected, there is a strong relation between W and w. For a given Mersenne divisor 'M,' the number of bits per coefficients 'b' is determined by b and b=int(log 2(M))+1. For example, if M=15, then b=4, indicating that a Mersenne divisor of 15 results in 4-bit coefficients. To determine the number of coefficients W, w is divided by b as follows: W=(int(w/b) !=w/b) ? int(w/b)+1: int(w/b). For example, if a number N has a width w of 32 bits and the Mersenne divisor M is 15, then b is 4 bits and W=int(32/4)=8. Similarly, if a number N has a width w of 31 bits and the Mersenne divisor M is 15, then b is 4 bits and W=int(31/4)+1=8. Further, if a number N has a width w of 33 bits and the Mersenne divisor M is 15, then b is 4 bits and W=int(33/4)=9.

In general, any integer N with W base 16 digits may be represented in a base 16 format as shown in Equation 1 below:

$$N=\Sigma_{n=0}^{W-1}[(q_{16,n})*16^n] \quad\quad 1$$

where W is the number of base 16 digits, $(q_{16},n)$ is the base 16 coefficient of digit n, and N is the represented number. A 32-bit number N represented in base 16 format has W=32 bits÷4 bits/digit=8 digits. To determine the residue value from a modulo 15 operation, and noting that 15=16−1, the multiplier of Equation 1 may be rewritten resulting in Equation 2 below:

$$N=\Sigma_{n=0}^{W-1}[(q_{16,n})*(15+1)^n] \quad\quad 2$$

The multiplier of Equation 1 may be converted via binomial expansion, resulting in Equation 3 below:

$$N=\Sigma_{n=0}^{W-1}[(q_{16,n})*(\Sigma_{k=0}^{n}C_{k,n}*15^k)] \quad\quad 3$$

where $(C_k,n)$ is the result of the binomial expansion of $(15+1)^n$, and N is the represented number. Given Equation 3, for each value of n from 0 to W−1, the content of the expression within the square brackets is a sum of products. Each of those sums have n+1 terms (for k=0 to k=n). The only term in each sum is $(q_{16,n})*C_{k,n}*15^k$. Each of these terms are powers of 15, and therefore do not contribute to the residue value, except where k=0. For k=0, the term is $(q_{16,n})*C_{0,n}*15^0$. Given that each of $C_{0,n}$ and $15^0$ is equal to 1, Equation 3 may be rewritten, resulting in Equation 4 below:

$$N=\Sigma_{n=0}^{W-1}q_{16,n}+(\Sigma_{n=1}^{W-1}[(q_{16,n})*(\Sigma_{k=1}^{n}C_{k,n}*15^k)]) \quad\quad 4$$

The terms of the summation operation of the right-hand addend are each multiplied by $15^k$, where k is an integer greater than or equal to 1. Therefore, all terms of the summation operation, and the result of the summation operation, are multiples of 15. Because a modulo operation generator where the dividend is a multiple of the divisor produces a result of 0, the right-hand addend of Equation 4 does not affect the residue value. Therefore, only the left-hand addend of Equation 4 affects the residue value. This left-hand addend is referred to herein as the coefficient sum $S_c$, as shown in Equation 5 below:

$$S_c=\Sigma_{n=0}^{W-1}q_{16,n} \quad\quad 5$$

The summation shown in Equation 5 represents the sum of the coefficients of the base 16 number. Although the coefficient sum is the only contributor to the final residue value of the modulo operation, the coefficient sum may be greater than 15. Therefore, the coefficient sum is processed to generate a final residue value that is less than 15. The disclosed modulo operation generator that determines the coefficient sum and processes the coefficient sum to generate the final residue value is now described.

Figure 4:
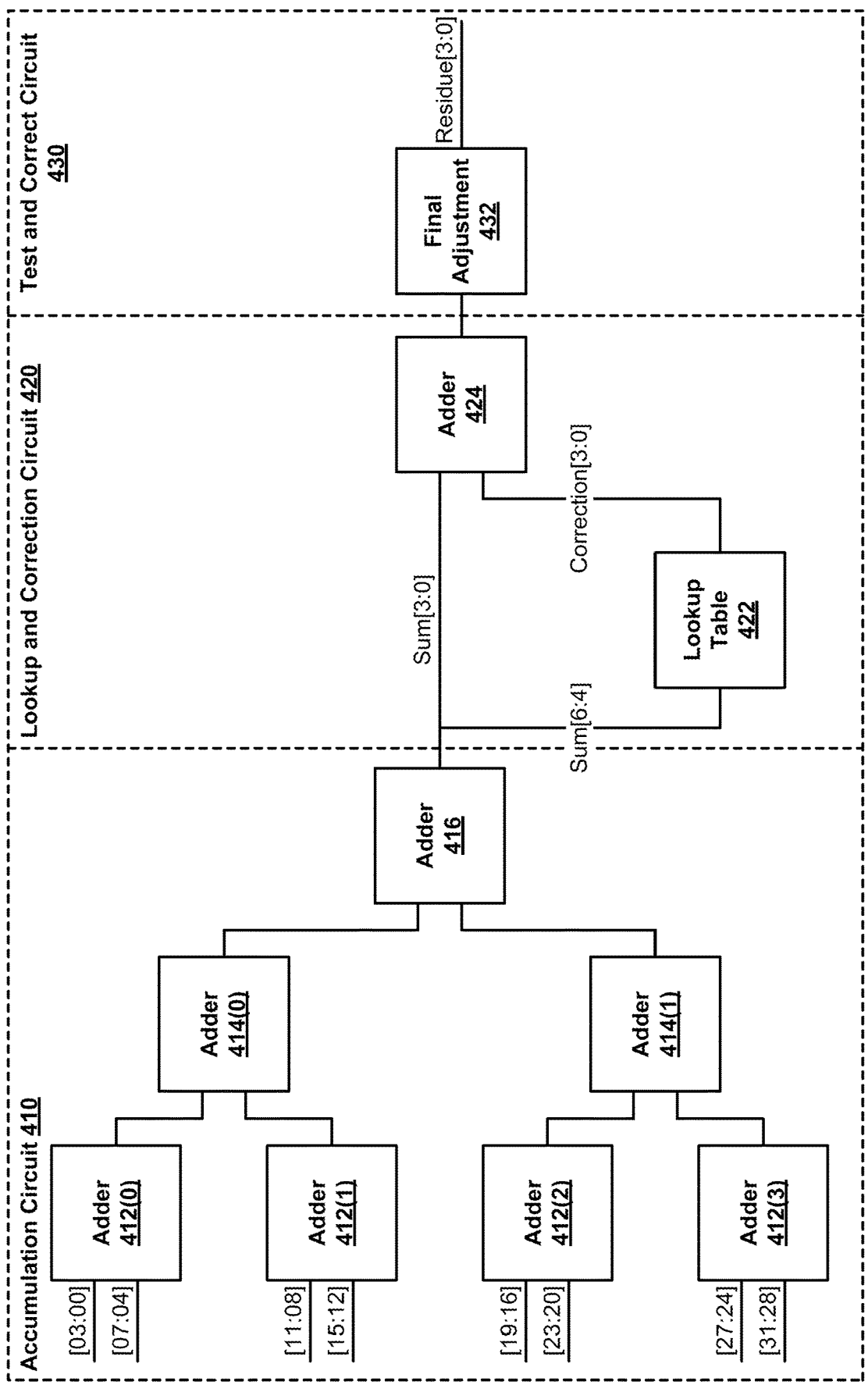
FIG. 4 is a conceptual diagram of a modulo 15 operation generator that the parallel processing unit of FIG. 2 can be configured to implement, according to various embodiments.

FIG. 4 is a conceptual diagram of a modulo 15 operation generator that the parallel processing unit of FIG. 2 can be configured to implement, according to various embodiments. In some embodiments, the modulo 15 operation generator may be implemented as a portion of the modulo operation generator 312 and/or as a portion of the modulo operation generator 322 of FIG. 3. As shown, the modulo operation generator includes an accumulation circuit 410, a lookup and correction circuit 420, and a test and correct circuit 430. The modulo 15 operation generator takes advantage of the fact that 15 is a Mersenne number, where 15=16−1. Accordingly, the input value is represented in base 16 format. As a result, each coefficient of the input value, when represented in base 16 format, is a 4-bit number.

In operation, the accumulation circuit 410 performs a summation operation on the base 16 coefficients of the input value together to generate the coefficient sum $Sc=\Sigma_{n=0}^{n=W-1} q_{16,n}$. Because the input value is a 32-bit number, the accumulation circuit 410 performs the summation operation on eight 4-bit coefficients. The accumulation circuit 410 adds the coefficients via a series of stages. The first stage includes adders 412(0), 412(1), 412(2), and 412(3). The second stage includes adders 414(0) and 414(1). The third stage includes adder 416.

In the first stage, adder 412(0) generates the sum of the coefficients for W=0 (bits [03:00]) and W=1 (bits [04:07]). Similarly, adder 412(1) generates the sum of the coefficients for W=2 (bits [11:08]) and W=3 (bits [15:12]). Adder 412(2) generates the sum of the coefficients for W=4 (bits [19:16]) and W=5 (bits [23:20]). Adder 412(3) generates the sum of the coefficients for W=6 (bits [27:24]) and W=7 (bits [31:28]). In the second stage, adder 414(0) generates the sum of the output of adder 412(0) and the output of adder 412(1). Similarly, adder 414(1) generates the sum of the output of adder 412(2) and the output of adder 412(3). In the third stage, adder 416 generates the sum of the output of adder 414(0) and the output of adder 414(1).

Adding two 4-bit numbers may result in a sum that is greater than 15, the maximum value that can be represented by a 4-bit number. Therefore, each of adders 412(0), 412(1), 412(2), and 412(3) generates a sum that includes a fifth bit, referred to herein as a "guard bit." Similarly, adding two 5-bit numbers may result in a sum that is greater than 31, the maximum value that can be represented by a 5-bit number. Therefore, each of adders 414(0) and 414(1) generates a sum with a sixth bit, representing a second guard bit. Adding two 6-bit numbers may result in a sum that is greater than 63, the maximum value that can be represented by a 6-bit number. Therefore, adder 416 generates a sum with a seventh bit, representing a third guard bit. The accumulation circuit 410 generates a Sum[6:0] that includes a 4-bit lower portion Sum[3:0] and three guard bits Sum[6:4]. The accumulation circuit 410 transmits the Sum[6:0] to the lookup and correction circuit 420.

More generally, the number of adders, stages, and guard bits included in the accumulation circuit 410 depends on the number and width of the coefficients of the input value. For an input value with W coefficients and represented in a particular base format, the number of guard bits added in the accumulation circuit 410 is log 2(W/log 2(base)).

In operation, the lookup and correction circuit 420 receives the Sum[6:0] from the accumulation circuit 410. The lookup and correction circuit 420 separates the Sum[6:0] into two components. The first component Sum[3:0] includes the least significant bits of the Sum[6:0] and is the same width as the coefficients of the input value. Because the input value is represented in base 16, each coefficient of the input value is a 4-bit number. Therefore, the first component Sum[3:0] includes the four least significant bits of the Sum[6:0]. The second component Sum[6:4] includes the most significant bits of the Sum[6:0]. The second component Sum[6:4] represents the value of the guard bits generated by the adders of the accumulation circuit 410.

The lookup and correction circuit 420 routes the first component Sum[3:0] to an adder 424. The lookup and correction circuit 420 routes the second component Sum[6:4] to a lookup table 422. The value of Sum[6:4] represents a multiple of 16 included in the Sum[6:0]. For example, Sum[6:4]=001 represents a value of 16, Sum[6:4]=010 represents a value of 32, Sum[6:4]=011 represents a value of 48, and so on. In order to generate a modulo 15 residue value, the number 15 is effectively subtracted from Sum[6:0] until the residue value is in the range of 0 to 14. Because the modulo divisor of 15 is a Mersenne number, the modulo divisor may be written as 16−1. Therefore, subtracting 15 from Sum[6:0] is equivalent to subtracting 16 and adding 1. Subtracting 30 from Sum[6:0] is equivalent to subtracting 32 and adding 2. Subtracting 45 from Sum[6:0] is equivalent to subtracting 48 and adding 3, and so on. The lookup table 422 performs this function by receiving the second component Sum[6:4], which is a multiple of 16, and generating a Correction[3:0] that represents the corresponding number to add to the first component Sum[3:0]. The correction values for various input values are shown in Table 1 below.

TABLE 1

Correction Values for Modulo 15 Generator

| Sum[6:4] | Subtracted Value | Added Value | Correction[3:0] |
|---|---|---|---|
| 000 | 0 | 0 | 0000 |
| 001 | 16 | 1 | 0001 |
| 010 | 32 | 2 | 0010 |
| 011 | 48 | 3 | 0011 |
| 100 | 64 | 4 | 0100 |
| 101 | 80 | 5 | 0101 |
| 110 | 96 | 6 | 0110 |
| 111 | 112 | 7 | 0111 |

For a modulo 15 generator and 32-bit input values, the width of the input Sum[6:4] is three bits. The number of entries, referred to herein as the "depth," of the lookup table 422 is eight, and the width of the output Correction[3:0] is four bits. The output Correction[3:0] in the range of 0 to 7. More generally, the depth of the lookup table 422 is Depth=w÷(log$_2$(base)), where 'w' is the width in number of bits of the input value. The width of the correction output of the lookup table 422 is Width=log$_2$(base).

The lookup table 422 transmits the Correction[3:0] to the adder 424. The adder 424 adds the first component Sum[3:0] to the Correction[3:0] to generate a preliminary residue value. The adder 424 transmits the preliminary residue value to the test and correct circuit 430.

In operation, the test and correct circuit 430 performs a final correction if the preliminary residue value is greater than 15. The first component Sum[3:0] is in the range of 0-15, while the Correction[3:0] is in the range of 0-7. Therefore, the preliminary residue value generated by the adder 424 is a 5-bit value in the range of 0-23. The final adjustment 432 tests the preliminary residue value to determine whether the preliminary residue value is less than 15. If the preliminary residue value is less than 15, then the final adjustment 432 passes the least significant 4 bits of the preliminary residue value as the final Residue[3:0]. If, however, the preliminary residue value is greater than or equal to 15, then the final adjustment 432 subtracts 15 from the preliminary residue value to generate the final Residue[3:0].

The disclosed techniques may further be applied to certain modulo operations where the divisor is not a Mersenne number, within the scope of the present disclosure. For example, the disclosed techniques may further be applied to certain modulo operations where the divisor is a Fermat number. Fermat numbers, as referred to herein, are of the form $F=2^n+1$, where n is an integer. For n=2, 3, 4, or 5, the corresponding Fermat numbers are 5, 9, 17, and 33, respectively.

Figure 5:
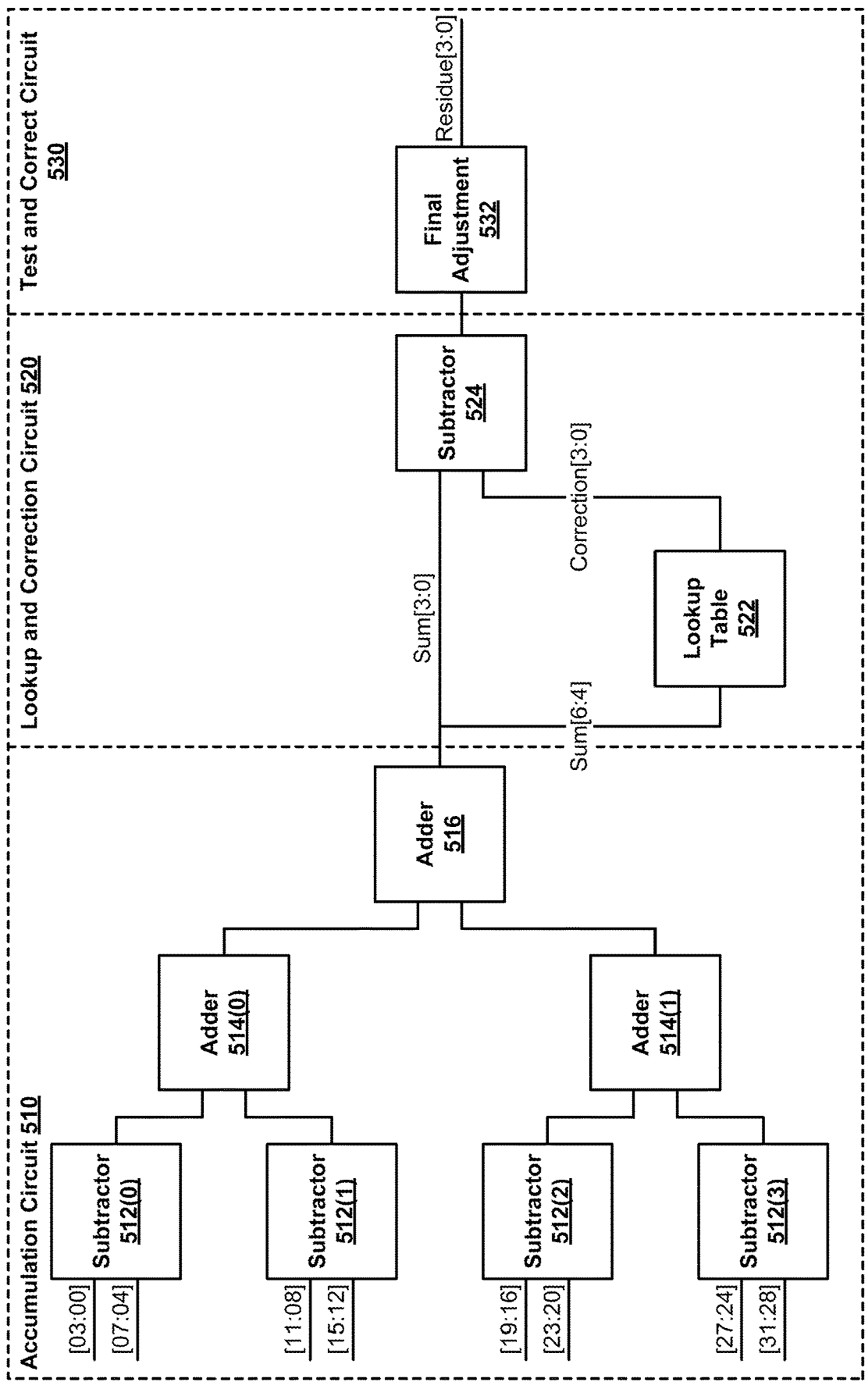
FIG. 5 is a conceptual diagram of a modulo 17 operation generator that the parallel processing unit of FIG. 2 can be configured to implement, according to various embodiments.

FIG. 5 is a conceptual diagram of a modulo 17 operation generator that the parallel processing unit of FIG. 2 can be configured to implement, according to various embodiments. In some embodiments, the modulo 17 operation generator may be implemented as a portion of the modulo operation generator 312 and/or as a portion of the modulo operation generator 322 of FIG. 3. As shown, the modulo operation generator includes an accumulation circuit 510, a lookup and correction circuit 520, and a test and correct circuit 530. The accumulation circuit 510, lookup and correction circuit 520, and test and correct circuit 530 function substantially the same as the accumulation circuit 410, lookup and correction circuit 420, and test and correct circuit 430 of FIG. 4, respectively, except as further described below. The modulo 17 operation generator takes advantage of the fact that 17 is a Fermat number, where 17=16+1. Accordingly, the input value is represented in base 16 format. As a result, each coefficient of the input value, when represented in base 16 format, is a 4-bit number.

In operation, the accumulation circuit 510 adds the base 16 coefficients of the input value together to generate the coefficient sum $Sc = \sum_{n=0}^{n=W-1} -1^n * q_{16,n}$. The $-1^n$ term results from the fact that the divisor of the modulo number is a Fermat number rather than a Mersenne number. Therefore, coefficients for even values of W are added while coefficients for odd values of W are subtracted. Because the input value is a 32-bit number, the accumulation circuit 510 performs a summation operation on eight 4-bit coefficients. The accumulation circuit 510 performs the summation operation on the coefficients via a series of stages. The first stage includes subtractors 512(0), 512(1), 512(2), and 512(3). The second stage includes adders 514(0) and 514(1). The third stage includes adder 516.

In the first stage, subtractor 512(0) generates the difference of the coefficient for W=0 (bits [03:00]) minus the coefficient for W=1 (bits [04:07]). Similarly, subtractor 512(1) generates the difference of the coefficient for W=2 (bits [11:08]) minus the coefficient for W=3 (bits [15:12]). Subtractor 512(2) generates the difference of the coefficient for W=4 (bits [19:16]) minus the coefficient for W=5 (bits [23:20]). Subtractor 512(3) generates the difference of the coefficient for W=6 (bits [27:24]) minus the coefficient for W=7 (bits [31:28]). In the second stage, adder 514(0) generates the sum of the output of subtractor 512(0) and the output of subtractor 512(1). Similarly, adder 514(1) generates the sum of the output of subtractor 512(2) and the output of subtractor 512(3). In the third stage, adder 516 generates the sum of the output of adder 514(0) and the output of adder 514(1). The accumulation circuit 510 generates a Sum[6:0] that includes a 4-bit lower portion Sum[3:0] and three guard bits Sum[6:4]. The accumulation circuit 510 transmits the Sum[6:0] to the lookup and correction circuit 520. More generally, the number of subtractors, adders, stages, and guard bits included in the accumulation circuit 510 depends on the number and width of the coefficients of the input value.

In operation, the lookup and correction circuit 520 receives the Sum[6:0] from the accumulation circuit 510. The lookup and correction circuit 520 separates the Sum[6:0] into two components. The first component Sum[3:0] includes the least significant bits of the Sum[6:0] and is the same width as the coefficients of the input value. Because the input value is represented in base 16, each coefficient of the input value is a 4-bit number. Therefore, the first component Sum[3:0] includes the four least significant bits of the Sum[6:0]. The second component Sum[6:4] includes the most significant bits of the Sum[6:0]. The second component Sum[6:4] represents the value of the guard bits generated by the adders of the accumulation circuit 510.

The lookup and correction circuit 520 routes the first component Sum[3:0] to an subtractor 524. The lookup and correction circuit 520 routes the second component Sum[6:4] to a lookup table 522. The value of Sum[6:4] represents a multiple of 16 included in the Sum[6:0]. For example, Sum[6:4]=001 represents a value of 16, Sum[6:4]=010 represents a value of 32, Sum[6:4]=011 represents a value of 48, and so on. In order to generate a modulo 17 residue value, the number 17 is effectively subtracted from Sum[6:0] until the residue value is in the range of 0 to 16. Because the modulo divisor of 17 is a Fermat number, the modulo divisor may be written as 16+1. Therefore, subtracting 17 from Sum[6:0] is equivalent to subtracting 16 followed by subtracting 1. Subtracting 34 from Sum[6:0] is equivalent to subtracting 32 followed by subtracting 2. Subtracting 51 from Sum[6:0] is equivalent to subtracting 48 followed by subtracting 3, and so on. The lookup table 522 performs this function by receiving the second component Sum[6:4], which is a multiple of 16, and generating a Correction[3:0] that represents the corresponding number to subtract from the first component Sum[3:0]. The correction values for various input values are shown in Table 2 below.

TABLE 2

Correction Values for Modulo 17 Generator

| Sum[6:4] | First Subtracted Value | Second Subtracted Value | Correction[3:0] |
|---|---|---|---|
| 000 | 0 | 0 | 0000 |
| 001 | 16 | 1 | 0001 |
| 010 | 32 | 2 | 0010 |
| 011 | 48 | 3 | 0011 |
| 100 | 64 | 4 | 0100 |
| 101 | 80 | 5 | 0101 |
| 110 | 96 | 6 | 0110 |
| 111 | 112 | 7 | 0111 |

The lookup table 522 transmits the Correction[3:0] to the subtractor 524. The subtractor 524 subtracts the Correction[3:0] from the first component Sum[3:0] to generate a preliminary residue value. The subtractor 524 transmits the preliminary residue value to the test and correct circuit 530.

Alternatively, and equivalently, the lookup table 522 may generate a signed integer that represents a negative number that is added to the first component Sum[3:0] In such cases, a first subtracted value of 16 may generate an added value of −1, a first subtracted value of 32 may generate an added value of −2, a first subtracted value of 48 may generate an added value of −3, and so on. Subtractor 524 would be replaced by an adder that adds the first component Sum[3:0] to the negative value represented by Correction[3:0] to generate a preliminary residue value. The adder transmits the preliminary residue value to the test and correct circuit 530.

In operation, the test and correct circuit 530 performs a final correction if the preliminary residue value is greater than 17. The final adjustment 532 tests the preliminary residue value to determine whether the preliminary residue value is less than 17. If the preliminary residue value is less than 17, then the final adjustment 532 passes the least significant 4 bits of the preliminary residue value as the final Residue[3:0]. If, however, the preliminary residue value is greater than or equal to 17, then the final adjustment 532 subtracts 17 from the preliminary residue value to generate the final Residue[3:0].

In some embodiments, a modulo operation generator may be multimodal, where the modulo operation generator is configurable to generate a modulo residue value for a divisor selected from two or more possible divisors. In one example, a modulo operation generator may be configurable to generate either a modulo 3 residue value or a modulo 15 residue value. Such a modulo operation generator is now described.

Figure 6A:
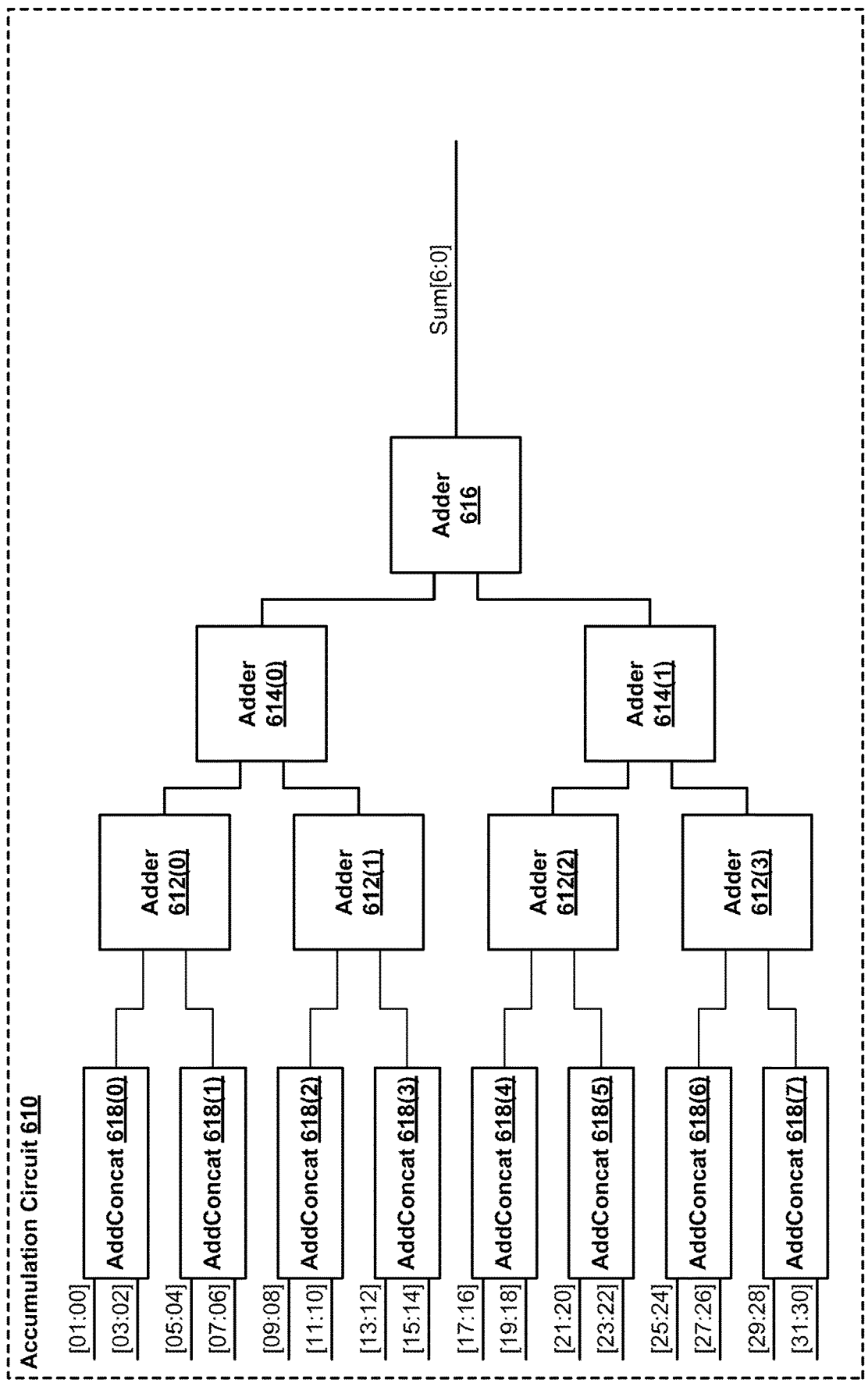
FIGS. 6A-6B set forth a conceptual diagram of a modulo 3/15 operation generator that the parallel processing unit of FIG. 2 can be configured to implement, according to various embodiments.
Figure 6B:
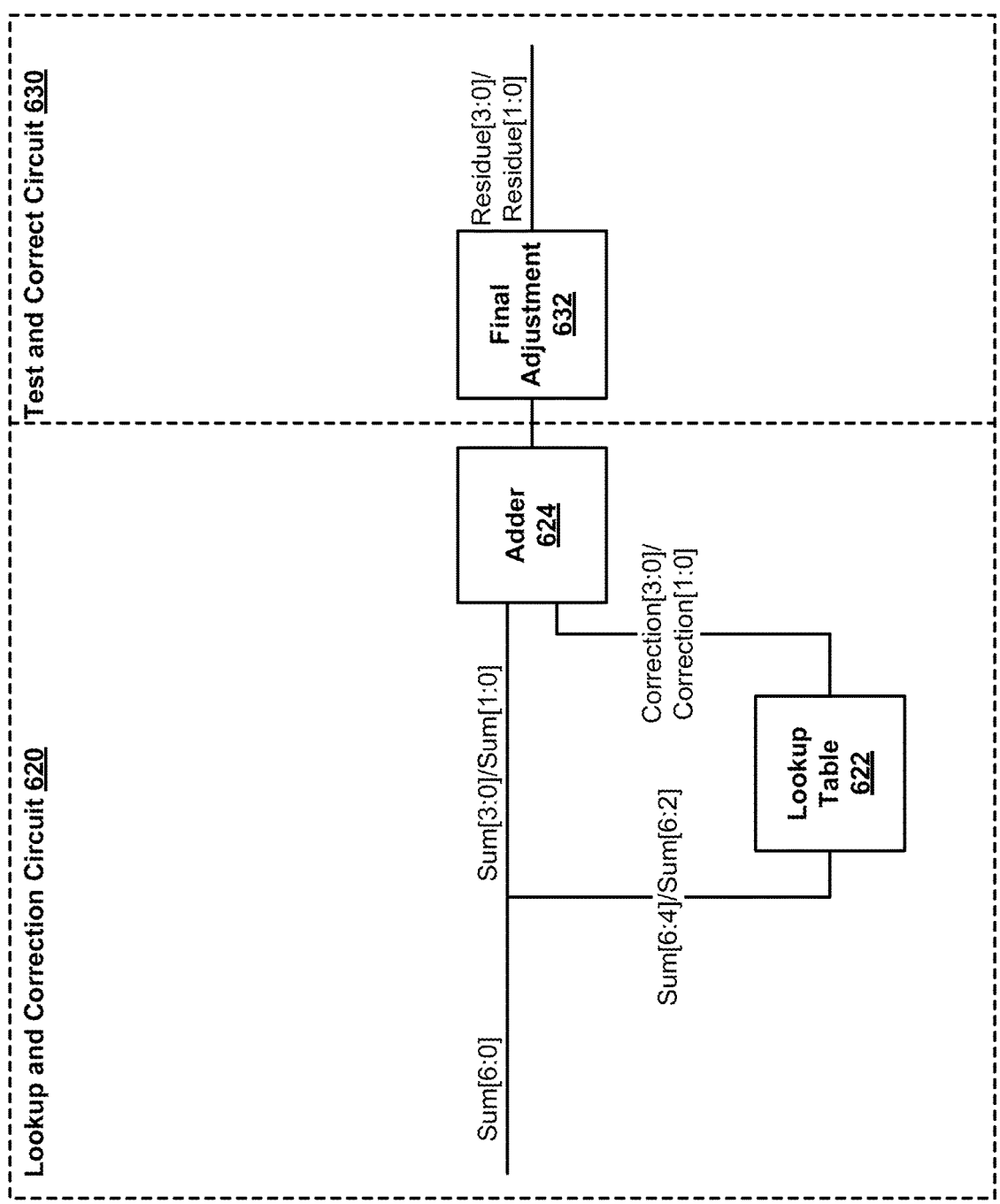

FIGS. 6A-6B set forth a conceptual diagram of a modulo 3/15 operation generator that the parallel processing unit of FIG. 2 can be configured to implement, according to various embodiments. In some embodiments, the modulo 3/15 operation generator may be implemented as a portion of the modulo operation generator 312 and/or as a portion of the modulo operation generator 322 of FIG. 3. As shown, the modulo operation generator includes an accumulation circuit 610, a lookup and correction circuit 620, and a test and correct circuit 630. The accumulation circuit 610, lookup and correction circuit 620, and test and correct circuit 630 function substantially the same as the accumulation circuit 410, lookup and correction circuit 420, and test and correct circuit 430 of FIG. 4, respectively, except as further described below. Similarly, the accumulation circuit 610, lookup and correction circuit 620, and test and correct circuit 630 function substantially the same as the accumulation circuit 510, lookup and correction circuit 520, and test and correct circuit 530 of FIG. 5, respectively, except as further described below. The modulo 3/15 operation generator receives a selection of a divisor from a plurality of divisors, where the plurality of divisors includes 3 and 15. If the selected divisor is 3, then the modulo operation generator configures at least one of the accumulation circuit 610, the lookup and correction circuit 620, or the test and correct circuit 630 to perform a modulo 3 operation. If the selected divisor is 15, then the modulo operation generator configures at least one of the accumulation circuit 610, the lookup and correction circuit 620, or the test and correct circuit 630 to perform a modulo 15 operation.

The modulo 3/15 operation generator takes advantage of the fact that both 3 and 15 are Mersenne numbers, where 3=4−1 and 15=16−1. Accordingly, in modulo 3 mode, the input value is represented in base 4 format. As a result, each coefficient of the input value, when represented in base 4 format, is a 2-bit number. In modulo 15 mode, the input value is represented in base 16 format. As a result, each coefficient of the input value, when represented in base 16 format, is a 4-bit number.

In operation, the accumulation circuit 610 performs a summation operation on the coefficients of the input value together to generate the coefficient sum $Sc = \Sigma_{n=0}^{n=W-1} q_{16,n}$. The accumulation circuit 610 adds the coefficients via a series of stages. The first stage includes add/concatenate units (also referred to herein as "AddConcat" units) 618(0), 618(1), 618(2), 618(3), 618(4), 618(5), 618(6), and 618(7). The second stage includes adders 612(0), 612(1), 612(2), and 612(3). The third stage includes adders 614(0) and 614(1). The fourth stage includes adder 616.

In modulo 3 mode, because the input value is a 32-bit number, the accumulation circuit 610 performs the summation operation on sixteen 2-bit coefficients. In modulo 3 mode, the add/concatenate units 618 are configured to be in add mode. Each add/concatenate unit 618 adds two adjacent 2-bit coefficients. In that regard, add/concatenate unit 618(0) generates the sum of the coefficients for W=0 (bits [01:00]) and W=1 (bits [03:02]). Similarly, add/concatenate unit 618(1) generates the sum of the coefficients for W=2 (bits [05:04]) and W=3 (bits [07:06]). Add/concatenate units 618(2), 618(3), 618(4), 618(5), and 618(6) similarly generate sums for respective pairs of coefficients, add/concatenate unit 618(7) generates the sum of the coefficients for W=14 (bits [29:28]) and W=15 (bits [31:30]). Each add/concatenate unit 618 generates a 3-bit sum, including one guard bit.

In the second stage, adder 612(0) generates the sum of the output of add/concatenate unit 618(0) and the output of add/concatenate unit 618(1). Similarly, adders 612(1)-612(3) generate the sum of the output of respective pairs of add/concatenate units 618. Each adder 612 generates a 4-bit sum, including two guard bits. In the third stage, adder 614(0) generates the sum of the output of adder 612(0) and the output of adder 612(1). Similarly, adder 614(1) generates the sum of the output of adder 612(2) and the output of adder 612(3). Each adder 614 generates a 5-bit sum, including three guard bits. In the fourth stage, adder 616 generates the sum of the output of adder 614(0) and the output of adder 614(1). Adder 614 generates a 6-bit sum, including three guard bits. The accumulation circuit 610 generates a Sum[6:0] that includes a 2-bit lower portion Sum[1:0] and four guard bits Sum[5:2]. Sum[06] is 0 in modulo 3 mode. The accumulation circuit 610 transmits the Sum[6:0] to the lookup and correction circuit 620.

In operation, the lookup and correction circuit 620 receives the Sum[6:0] from the accumulation circuit 610. The lookup and correction circuit 620 separates the Sum[6:0] into two components. The first component Sum[1:0] includes the least significant bits of the Sum[6:0] and is the same width as the coefficients of the input value. Because the input value is represented in base 4, each coefficient of the input value is a 2-bit number. Therefore, the first component Sum[1:0] includes the two least significant bits of the Sum[6:0]. The second component Sum[6:2] includes the most significant bits of the Sum[6:0]. The second component Sum[6:2] represents the value of the guard bits generated by the adders of the accumulation circuit 610, with Sum[6] set to 0.

The lookup and correction circuit 620 routes the first component Sum[1:0] to an adder 624. The lookup and correction circuit 620 routes the second component Sum[6:2] to a lookup table 622. The value of Sum[6:2] represents a multiple of 4 included in the Sum[6:0]. For example, Sum[6:2]=0 0001 represents a value of 4, Sum[6:2]=0 0010 represents a value of 8, Sum[6:2]=0 0011 represents a value of 12, and so on. In order to generate a modulo 3 residue value, the number 3 is effectively subtracted from Sum[6:0] until the residue value is in the range of 0 to 2. Because the modulo divisor of 3 is a Mersenne number, the modulo divisor may be written as 4−1. Therefore, subtracting 3 from Sum[6:0] is equivalent to subtracting 4 and adding 1. Subtracting 6 from Sum[6:0] is equivalent to subtracting 8 and adding 2. Subtracting 9 from Sum[6:0] is equivalent to subtracting 12 and adding 3, and so on. The lookup table 622 performs this function by receiving the second component Sum[6:2], which is a multiple of 4, and generating a Correction[1:0] that represents the corresponding number to add to the first component Sum[1:0]. The correction values for various input values are shown in Table 3 below.

TABLE 3

Correction Values for Modulo 3 Generator

| Sum[6:2] | Subtracted Value | Added Value | Correction[1:0] |
|---|---|---|---|
| 0 0000 | 0 | 0 | 00 |
| 0 0001 | 4 | 1 | 01 |
| 0 0010 | 8 | 2 | 10 |
| 0 0011 | 12 | 3 − 3 = 0 | 00 |
| 0 0100 | 16 | 4 − 3 = 1 | 01 |
| 0 0101 | 20 | 5 − 3 = 2 | 10 |
| 0 0110 | 24 | 6 − 6 = 0 | 00 |
| 0 0111 | 28 | 7 − 6 = 1 | 01 |
| 0 1000 | 32 | 8 − 6 = 2 | 10 |
| 0 1001 | 36 | 9 − 9 = 0 | 00 |
| 0 1010 | 40 | 10 − 9 = 1 | 01 |
| 0 1011 | 44 | 11 − 9 = 2 | 10 |
| 0 1100 | 48 | 12 − 12 = 0 | 00 |
| 0 1101 | 52 | 13 − 12 = 1 | 01 |
| 0 1110 | 56 | 14 − 12 = 0 | 10 |
| 0 1111 | 60 | 15 − 15 = 0 | 00 |
| N/A | N/A | N/A | N/A |

For a modulo 3 generator and 32-bit input values, the width of the input Sum[6:2] is four bits Sum[5:2], corresponding to the four guard bits, plus the unused bit Sum[6]. The number of active entries, corresponding to Sum[5:2], of the lookup table 422 is sixteen, and the width of the output Correction[1:0] is two bits. The output Correction[1:0] in the range of 0 to 3. The lookup table 422 transmits the Correction[1:0] to the adder 624. The adder 624 adds the first component Sum[1:0] to the Correction[1:0] to generate a preliminary residue value. The adder 624 transmits the preliminary residue value to the test and correct circuit 630.

In operation, the test and correct circuit 630 performs a final correction if the preliminary residue value is greater than 2. The first component Sum[1:0] is in the range of 0-3, while the Correction[1:0] is in the range of 0-2. Therefore, the preliminary residue value generated by the adder 624 is a 5-bit value in the range of 0-5. The final adjustment 632 tests the preliminary residue value to determine whether the preliminary residue value is less than 3. If the preliminary residue value is less than 3, then the final adjustment 632 passes the least significant 2 bits of the preliminary residue value as the final Residue[1:0]. If the preliminary residue value is greater than or equal to 3, then the final adjustment 632 subtracts 3 from the preliminary residue value to generate the final Residue[1:0].

In modulo 15 mode, because the input value is a 32-bit number, the accumulation circuit 610 performs the summation operation on eight 4-bit coefficients. In modulo 15 mode, the add/concatenate units 618 are configured to be in concatenate mode. Each add/concatenate unit 618 passes the four input bits to the output of the add/concatenate unit 618 to generate a 4-bit coefficient. The add/concatenate units 618 do not perform a summation operation or add any guard bits. As a result, each of the adders 612(0)-612(3) add two 4-bit coefficients, as described in conjunction with the adders 412(0)-412(3) FIG. 4. Similarly, each of the adders 614(0)-614(1) add two 5-bit coefficients, as described in conjunction with the adders 414(0)-414(1) FIG. 4. Adders 616 adds two 6-bit coefficients, as described in conjunction with the adder 416 FIG. 4. The lookup and correction circuit 620 and the test and correct circuit 630 process the output of the accumulation circuit 610 in the manner described in conjunction with FIG. 4. As a result, the modulo 3/15 operation generator is configurable to generate either modulo 3 residue values or modulo 15 residue values in a single circuit.

It will be appreciated that the system shown herein is illustrative and that variations and modifications are possible. In one example, the disclosed modulo operation generator may be configured to generate residue values for any Mersenne number divisor. The disclosed modulo operation generator may be configured to perform modulo 3 operations, modulo 7 operations, modulo 15 operations, modulo 31 operations, and so on, up to the width of the input values. In another example, the disclosed modulo operation generator may be configured to generate residue values for any Fermat number divisor. The disclosed modulo operation generator may be configured to perform modulo 5 operations, modulo 9 operations, modulo 17 operations, modulo 33 operations, and so on, up to the width of the input values. In yet another example, the disclosed modulo operation generator may be configurable to generate different combinations of modulo operations with Mersenne number divisors in a single circuit. If the add/concatenate units 618 of FIGS. 6A and 6B received two 3-bit values rather than two 2-bit values, the modulo operation generator may be configurable to generate modulo 7 or modulo 31 residue values. In yet another example, the disclosed modulo operation generator may be configurable to generate different combinations of modulo operations with Fermat number divisors in a single circuit. The modulo operation generator may be configurable to generate modulo 5 or modulo 17 residue values. Additionally or alternatively, the modulo operation generator may be configurable to generate modulo 9 or modulo 33 residue values. Various such operation generators may be combined into a single circuit that may be configured to compute residue values for modulo 3, 5, 7, 9, 15, 17, 31, 33 operations. In yet another example, the disclosed modulo operation generator may be configured to generate residue values for divisors that are neither Mersenne nor Fermat numbers. If the modulo operation generator is configured to perform modulo operations for more than one divisor, the modulo operation generator receives a selection of a divisor from a plurality of divisors. The modulo operation generator configures at least one of the accumulation circuit, the lookup and correction circuit, or the test and correct circuit to perform the modulo operation based on the selected divisor.

For example, the modulo operation generator may be configured to generate residue values for modulo 14 or modulo 24 operations, with somewhat additional complexity relative to the modulo operation generators of FIGS. 5-6B.

Figure 7:
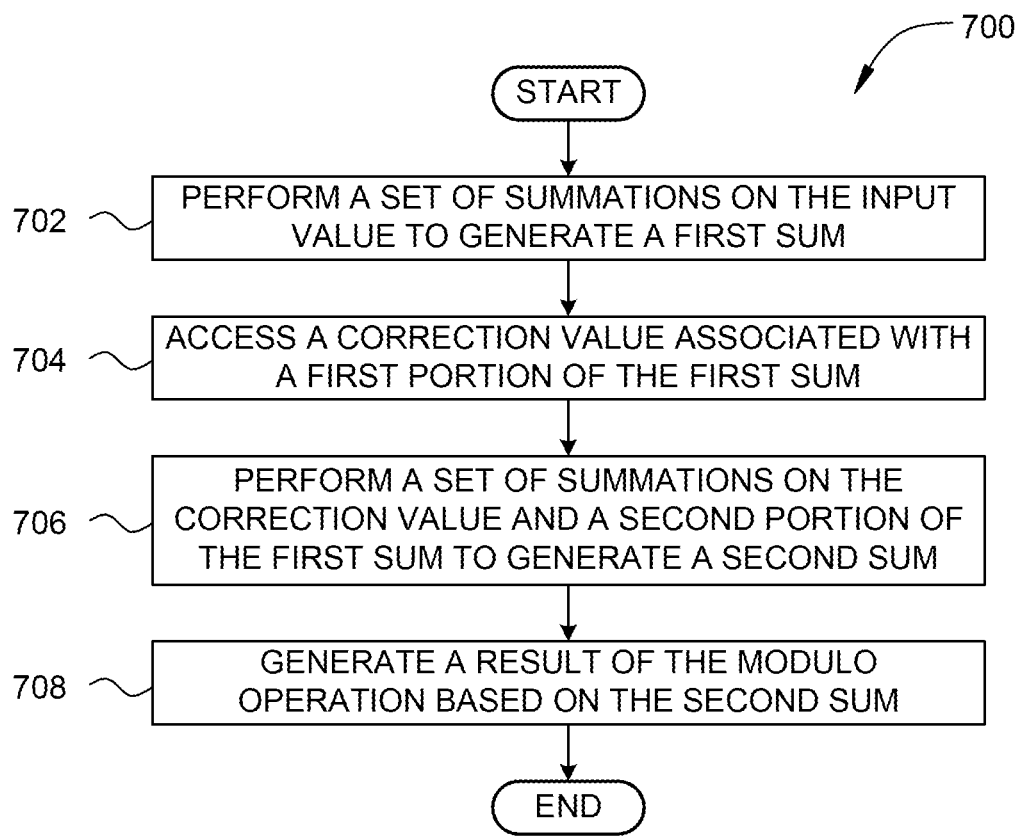
FIG. 7 is a flow diagram of method steps for performing a modulo operation via the parallel processing unit of FIG. 2, according to various embodiments.

FIG. 7 is a flow diagram of method steps for performing a modulo operation generator via the parallel processing unit of FIG. 2, according to various embodiments. Although the method steps are described in conjunction with the systems of FIGS. 1-6, persons of ordinary skill in the art will understand that any system configured to perform the method steps, in any order, is within the scope of the present disclosure.

As shown, a method 700 begins at step 702, where an accumulation circuit of a modulo operation generator performs a set of summations on an input value to generate a first sum. The accumulation circuit divides the input value into coefficients, where the number of bits in each coefficient is based on the divisor of the modulo operation. If the divisor is a Mersenne number, then the divisor may be represented by $M=2^n-1$, where n is the number of bits in each coefficient. The accumulation circuit performs the summation function for a Mersenne number divisor by adding the coefficients. The accumulation circuit may add the coefficient via a series of adder stages. The accumulation circuit generates a sum that may include one or more guard bits to prevent overflow when summing the coefficients.

If the divisor is a Fermat number, then the divisor may be represented by $F=2^n+1$, where n is the number of bits in each coefficient. The accumulation circuit performs the summation function for a Fermat number divisor by adding the coefficients corresponding to even powers of two and subtracting the coefficients corresponding to odd powers of two. The accumulation circuit may add the coefficient via a series of adder and/or subtractor stages. The accumulation circuit generates a sum that may include one or more guard bits to prevent overflow when summing the coefficients.

At step 704, a lookup and correction circuit of the modulo operation generator accesses a correction value associated with a first portion of the first sum. The first portion of the first sum includes the most significant bits of the first sum and corresponds to the guard bits added by the accumulation circuit. A second portion of the first sum includes the least significant bits of the first sum and includes the same number of bits as each coefficient of the input value. If the divisor is a Mersenne number, then the lookup function determines a correction value to add to the second portion of the first sum. If the divisor is a Fermat number, then the lookup function determines a correction value to subtract from the second portion of the first sum.

At step 706, the lookup and correction circuit performs a set of summations on the correction value and a second portion of the first sum to generate a second sum. If the divisor is a Mersenne number, then the lookup and correction circuit adds the correction value to the second portion the first sum to generate the second sum. If the divisor is a Fermat number, and if the correction value is expressed as a positive value, then the lookup and correction circuit subtracts the correction value from the second portion the first sum to generate the second sum. If, however, the divisor is a Fermat number, and if the correction value is expressed as a negative value, then the lookup and correction circuit adds the correction value to the second portion the first sum to generate the second sum.

At step 708, a test and correct circuit generates a result of the modulo operation based on the second sum. The test and correct circuit compares the second sum with the divisor of the modulo operation. If the second sum is less than the divisor of the modulo operation, then the test and correct circuit passes the least significant bits of the second sum value as the final residue value. If, however, the second sum is greater than or equal to the divisor of the modulo operation, then the test and correct circuit subtracts the value of the divisor from the second sum value to generate the final residue value. The method 700 then terminates.

In sum, various embodiments include a modulo operation generator in a computer-based system. The modulo operation generator includes an accumulation circuit that performs a first set of summations on an input value to generate a first sum. The first set of summations may include an addition function and/or a subtraction function. The modulo operation generator further includes a lookup and correction circuit that includes a lookup table and an adder. A first portion of the first sum is applied to a lookup table that generates a correction value. The adder performs a second set of summations on the correction value and a second portion of the first sum to generate a second sum. The modulo operation generator further includes a test and correct circuit that adjusts the second sum if the second sum is greater than or equal to the divisor of the modulo operation generator. The test and correct circuit transmits the final residue value determined by the modulo operation generator.

At least one technical advantage of the disclosed techniques relative to the prior art is that, with the disclosed techniques, modulo operations involving a divisor that is not a power of two are performed in less time relative to modulo operations involving a divisor that is a power of two. Further, modulo operations involving a divisor that is not a power of two are performed in the same amount of time regardless of the value of the dividend. As a result, operations that include a modulo operation, such as distributing data items among slices in a cache memory, are performed more efficiently relative to prior art techniques. More specifically, the performance of a cache memory that includes 15 slices or 17 slices may have the same, or nearly the same, performance as a cache memory that includes 16 slices. These advantages represent one or more technological improvements over prior art approaches.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for performing a modulo operation, the method comprising:
    performing, via a first circuit, a first set of summations on an input value associated with the modulo operation to generate a first sum;
    accessing, via a second circuit, a correction value associated with a first portion of the first sum;
    performing, via the second circuit, a second set of summations on the correction value and a second portion of the first sum to generate a second sum; and
    generating, via a third circuit, a result of the modulo operation based on the second sum.

2. The computer-implemented method of claim 1, wherein a divisor of the modulo operation is a Mersenne number, and wherein performing the first set of summations on the input value comprises:
    dividing the input value into a set of coefficients; and
    adding a first coefficient included in the set of coefficients to a second coefficient included in the set of coefficients.

3. The computer-implemented method of claim 1, wherein a divisor of the modulo operation is a Mersenne number, and wherein accessing the correction value comprises retrieving the correction value from a lookup table, wherein the correction value represents a number to add to the second portion of the first sum.

4. The computer-implemented method of claim 1, wherein a divisor of the modulo operation is a Mersenne number, and wherein performing the second set of summations on the correction value and the second portion of the first sum comprises adding the correction value to the second portion of the first sum.

5. The computer-implemented method of claim 1, wherein a divisor of the modulo operation is a Fermat number, and wherein performing the first set of summations on the input value comprises:
    dividing the input value into a first set of coefficients corresponding to even powers of two and a second set of the coefficients corresponding to odd powers of two; and
    subtracting a first coefficient included in the second set of coefficients from a second coefficient included in the first set of coefficients.

6. The computer-implemented method of claim 1, wherein a divisor of the modulo operation is a Fermat number, and wherein accessing the correction value comprises retrieving the correction value from a lookup table, wherein the correction value represents a number to subtract from the second portion of the first sum.

7. The computer-implemented method of claim 1, wherein a divisor of the modulo operation is a Fermat number, and wherein performing the second set of summations on the correction value and the second portion of the first sum comprises subtracting the correction value from the second portion of the first sum.

8. The computer-implemented method of claim 1, wherein generating the result of the modulo operation comprises:
    determining that the second sum is less than a divisor of the modulo operation; and
    setting the result to the second sum.

9. The computer-implemented method of claim 1, wherein generating the result of the modulo operation comprises:
    determining that the second sum is greater than or equal to a divisor of the modulo operation;
    computing a difference by subtracting the divisor from the second sum; and
    setting the result of the modulo operation to the difference.

10. A modulo operation generator, comprising:
    a first circuit that:
        performs a first set of summations on an input value to generate a first sum;
    a second circuit that:
        accesses a correction value associated with a first portion of the first sum, and
        performs a second set of summations on the correction value and a second portion of the first sum to generate a second sum; and
    a third circuit that:
        generates a result of a modulo operation based on the second sum.

11. The modulo operation generator of claim 10, further comprising:
    receiving a selection of a first divisor included in a plurality of divisors; and
    configuring at least one of the first circuit, the second circuit, or the third circuit to perform the modulo operation based on the first divisor.

12. The modulo operation generator of claim 11, wherein the first divisor and a second divisor included in the plurality of divisors are Mersenne numbers.

13. The modulo operation generator of claim 11, wherein the first divisor and a second divisor included in the plurality of divisors are Fermat numbers.

14. The modulo operation generator of claim 11, wherein the first divisor is a Mersenne number and a second divisor included in the plurality of divisors is a Fermat number.

15. The modulo operation generator of claim 10, wherein a divisor of the modulo operation is a Mersenne number, and wherein performing the first set of summations on the input value comprises:
dividing the input value into a set of coefficients; and
adding a first coefficient included in the set of coefficients to a second coefficient included in the set of coefficients.

16. The modulo operation generator of claim 10, wherein a divisor of the modulo operation is a Mersenne number, and wherein accessing the correction value comprises retrieving the correction value from a lookup table, wherein the correction value represents a number to add to the second portion of the first sum.

17. The modulo operation generator of claim 10, wherein a divisor of the modulo operation is a Mersenne number, and wherein performing the second set of summations on the correction value and the second portion of the first sum comprises adding the correction value to the second portion of the first sum.

18. The modulo operation generator of claim 10, wherein a divisor of the modulo operation is a Fermat number, and wherein performing the first set of summations on the input value comprises:
dividing the input value into a first set of coefficients corresponding to even powers of two and a second set of the coefficients corresponding to odd powers of two; and
subtracting a first coefficient included in the second set of coefficients from a second coefficient included in the first set of coefficients.

19. The modulo operation generator of claim 10, wherein a divisor of the modulo operation is a Fermat number, and wherein accessing the correction value comprises retrieving the correction value from a lookup table, wherein the correction value represents a number to subtract from the second portion of the first sum.

* * * * *